UNITED STATES PATENT OFFICE.

JOSHUA NORTON, JR., OF CHATHAM, CANADA.

ACID-RESISTING COMPOSITION FOR LINING TANKS.

SPECIFICATION forming part of Letters Patent No. 480,934, dated August 16, 1892.

Application filed November 22, 1890. Serial No. 372,358. (No specimens.)

*To all whom it may concern:*

Be it known that I, JOSHUA NORTON, Jr., a resident of Chatham, New Brunswick, Canada, have invented certain new and useful Improvements in Acid-Resisting Tank-Linings; and I do hereby declare the following to be a full, clear, and exact description of the invention, such as will enable others skilled in the art to which it pertains to make and use the same.

The object of this invention is to produce an acid-resisting tank-lining commonly known as "digesters," used in the manufacture of sulphate and sulphite wood pulp. I have found that a mixture of asbestus fiber, silicate of soda or of potash, and sulphate of baryta, and a mixture of these, to which is added pulverized fire-brick or seggar, stoneware, glass or glass-sand, and hydraulic cement, is very efficient for the purpose stated.

To enable others to prepare and use the improved lining, I will describe a suitable mode of mixing the ingredients and applying the same.

The digester having been thoroughly cleaned and all foreign matter removed from its inner surface, a thin paste composed of one part asbestus fiber, two parts sulphate of baryta, one to two parts Portland or other hydraulic cement, mixed with an aqueous solution of about 36° Baumé of silicate of soda is thoroughly rubbed and spread upon the inner surface of the digester until a coating similar to a thick coat of whitewash is deposited. The thickness of this coat should not be more than one-sixteenth to one-eighth inch thick. If thicker, the adhesion will be liable to be less than the tensile strength of the coating, and in drying the consequent contraction will pull it off from the iron instead of the cement cracking.

My object is to form on the iron of the digester a surface to which the following described composition will adhere—to wit, a mixture of two parts pulverized fire-brick, seggar, stoneware, glass or glass-sand, one part asbestus fiber, one part sulphate of baryta, two to four parts Portland or other hydraulic cement, and an aqueous solution of about 36° Baumé of silicate of soda, all thoroughly mixed and spread on the previous coat, either in one layer of one to two inches thick or in a succession of thin layers to that depth. This is allowed to "set" or harden, and is then thoroughly dried by the heat from a stove or other source. In this drying operation the temperature must be high enough to expel all the remaining free moisture from the composition, which heat will cause it to contract and crack. The coating is then examined and all cracks carefully filled. The digester can then be closed and steam admitted and maintained at a pressure of twenty to forty pounds for about four hours, whereupon leaks, if any, can be located by the vent-holes always provided in the iron of the digester and stopped. Next a composition of one part asbestus fiber, two parts of sulphate of baryta, and one part Portland or other hydraulic cement mixed with a solution of about 36° Baumé silicate of soda is laid upon the former layer to the thickness of about one inch, and the exposed surface is then rubbed down with a smooth trowel frequently wet with the solution of silicate of soda until a glass-like surface is obtained. It is then dried as before and all cracks filled with the composition. The digester is then ready for use and the lining will be found to resist the action of sulphurous acid. In the first coat the fire-brick is omitted for the reason that it would render the coat less adherent. The addition of the fire-brick to the second coat diminishes its liability to crack, and it is omitted from the last coat for the reason that the cement thereby has a closer texture and is more impervious to liquid.

Instead of applying the lining in coats of soft composition, as above specified, the composition may be made into tiles or bricks of any suitable size, thickness, or shape, and after the first or preparatory coat is put on the tile may be laid in a cement of a like composition, and the same may be done with the third or inside coating, the cement to be of the same composition as the tile used. Where time is an item of importance, this plan will be found advantageous, as the tiles can be dried in an oven before being laid in the digester, and in this case the digester can be set at work as soon as the lining is in.

As makers of sulphite wood pulp differ as to the thickness of linings, some preferring a thin lining to save space and others a thick lining to save loss of heat by radiation, I do not wish to confine myself to the exact proportions nor to thickness of lining, for with a thin lining a stronger composition, requiring thicker solution of silicate of soda and larger proportion of hydraulic cement, would be desirable, while in a thicker lining a modified or weaker composition would answer.

I am aware that the materials I use have been used in various combinations for binding cement and artificial stone, &c., and I do not claim such as my invention.

Having specified the ingredients, explained the methods of preparing them, and stated the use to which the invention is adapted, what I claim, and desire to secure by Letters Patent, is—

1. In an acid-resisting lining of a wood-pulp digester, a first or preparatory coating or layer composed of asbestus fiber, sulphate of baryta, and hydraulic cement and having a thickness of not more than about one-sixteenth of an inch, a second layer consisting of the same ingredients mixed with pulverized fire-brick, seggar, stoneware, and glass or glass-sand, and a third layer consisting of asbestus fiber, sulphate of baryta, and hydraulic cement, each layer containing silicate of soda, substantially as set forth.

2. A lining of a digester, composed of three superimposed layers or coats, the first consisting of hydraulic cement and other refractory material applied to the metal of the digester, the second containing hydraulic cement mingled with pulverized fire-brick and other refractory material and imposed upon the first, and the third containing hydraulic cement and refractory materials imposed upon the second, substantially as set forth.

In testimony whereof I have signed this specification in the presence of two subscribing witnesses.

JOSHUA NORTON, Jr.

Witnesses:
 JOHN U. LOGGIE,
 A. A. AUDENDAR.